United States Patent [19]
Holden

[11] 4,438,054
[45] Mar. 20, 1984

[54] METHOD AND APPARATUS FOR MEASURING AND CONTROLLING FOAM SHEET BLOW-UP IN A THERMOFORMER OVEN

[75] Inventor: M. James Holden, Canandaigua, N.Y.

[73] Assignee: Mobil Oil Corporation, New York, N.Y.

[21] Appl. No.: 435,590

[22] Filed: Oct. 20, 1982

[51] Int. Cl.³ .............................................. B29D 27/00
[52] U.S. Cl. .................................. 264/40.6; 264/321; 425/143; 425/817 C
[58] Field of Search ...................... 264/40.6, 40.4, 321; 425/143, 817 C

[56] References Cited

U.S. PATENT DOCUMENTS

| | | | |
|---|---|---|---|
| 3,711,584 | 1/1973 | Sagane et al. | 264/54 X |
| 3,801,244 | 4/1974 | Eisenberg | 264/40.6 X |
| 4,213,925 | 7/1980 | Kiyono et al. | 264/54 X |
| 4,244,897 | 1/1981 | Moon | 264/40.6 X |

Primary Examiner—Philip E. Anderson
Attorney, Agent, or Firm—A. J. McKillop; M. G. Gilman; J. F. Powers, Jr.

[57] ABSTRACT

A method and an apparatus for measuring and controlling foam sheet blow-up in a thermoformer oven. Control of the oven operation is achieved through monitoring the measured blow-up of a material which being heated in the thermoformer oven in order to regulate the thickness of the plastic material prior to its conveyance into a molding or forming station.

17 Claims, 4 Drawing Figures

METHOD AND APPARATUS FOR MEASURING AND CONTROLLING FOAM SHEET BLOW-UP IN A THERMOFORMER OVEN

BACKGROUND OF THE INVENTION

1. Field of the Invention

The present invention relates to a method and to an apparatus for measuring and controlling foam sheet blow-up in a thermoformer oven, and more particularly, controlling the oven operation through monitoring the sensed blow-up of a material which is being heated in the thermoformer oven in order to regulate the thickness of the plastic material prior to its conveyance into a molding or forming station.

In recent years, molded articles which are constituted of a thermoplastic foam material have gained wide commercial and consumer acceptance due to their economics in manufacture, aesthetic appeal and excellent physical properties. Among such articles are egg cartons, meat and food trays, cups and even larger items, such as boat hulls, refrigerator liners or the like, which are readily molded from a thermoformable plastic material. For instance, it is possible to mass-produce thermoformed articles in an extremely economical manner by heating a continuous sheet of a thermoplastic foam material, for example, foamable polystyrene or similar materials, to a predetermined temperature in a thermoformer oven so that the material is in a thermoplastic state, and from there conveying the heated sheet into a molding station or forming press, in which the thermoformed article configurations are molded into the sheet of the plastic foam material.

In essence, the heating to the molding temperature of the thermoplastic foam material in the thermoformer oven not only plasticizes the material but concurrently therewith expands the foam material so that the thickness of the material is increased up to approximately 1.5 to 2.0 times the original thickness during its conveyance through the oven. Although this phenomenon, known as "sheet blow-up" is three dimensional in nature, orientation stresses purposely built into the material during extrusion thereof, opposed by the clamping action of the sheet gripping and conveying mechanism in the thermoformer oven, and the continuity of the sheet in the machine direction, result in minimal changes in the sheet length and width during heating of the latter in the thermoformer oven. The increase in the sheet thickness during heating is desirable since it reduces the density of the foam material and allows for the subsequent filling of wider mold gaps at various portions of specific foam plastic articles.

The mold gap in the production tooling, in effect, the void in the mold which is occupied by the product, may vary at different locations throughout the total mold cross-section for various reasons relating to desired final product shape, strength, functional needs, or aesthetics. Thickness of the expanded foam prior to entry into the mold is important since it is desirable to fill all portions of the mold gap throughout the various cross-sections of the mold cavity, and this must be accomplished while counteracting the thinning of the heated material as various portions are stretched and formed into the desired contours of the finished article.

In order to be able to provide molded products in the molding station which evidence a high degree of definition in its conformance with the configurations of the mold, and which provide a consistency and appearance essential to their saleability and utility, it is necessary to heat the plastic material to a predetermined temperature in the thermoformer oven and to maintain the material at that temperature to thereby achieve the desired extent of sheet "blow-up" or expansion. Variations in the temperature over the surface of the heated sheet of plastic material as it is conducted from the thermoformer oven into the forming press will adversely affect the uniformity in the foam material thickness and, as a consequence, the consistency and quality of the thermoformed articles.

Generally, the thermoformable foam plastic sheet is heated by radiant energy heating during its conveyance through the thermoformer oven through the intermediary of a series of heater elements which are usually arranged above and below the path of travel of the material. Such heater elements, which direct the radiant heat against the surfaces of the sheet of plastic material, may be constituted of suitable parabolic heaters, bar heaters, infrared heaters, or ceramic blocks having heating coils therein, which normally extend transverse of the direction of travel of the plastic material sheet through the thermoformer oven, with the heater elements being energized from an external power source. Additional heater elements may be provided along the edges of the oven to compensate for heat losses to gripping devices which engage the edges of the sheet for transporting the latter through the thermoformer oven. Upon leaving the thermoformer oven, the thus heated thermoplastic sheet is introduced into a thermoforming press and interposed between the surfaces of a pair of mold members which cooperate to force or mold the heated thermoplastic material into the shape of the thermoformed articles defined by the contours of the mold surfaces.

2. Discussion of the Prior Art

At this time, no systems have been developed or employed which will measure the blow-up or thickness expansion of a foam plastic material as it is heated in a thermoformer oven. Currently, temperature conditions within the thermoformer oven, which are assumed to be indicative of the temperatures to which the plastic material has been heated and the blow-up thereof, usually are monitored by temperature sensors or thermocouples which measure the temperature of one of the heater elements in each heat zone within the thermoformer oven; of particular importance being the temperature of the material at the discharge end of the thermoformer oven. Any differentials in the monitored or sensed temperatures which deviate from desired temperature levels are read by an operator who will then manually regulate the energy input to various of the heater elements in order to either raise or lower the temperature in those zones of the oven so as to provide and maintain the optionally desired thermoplastic material temperatures and resultant blow-up.

Although monitoring or sensing the temperature conditions within the thermoformer oven and controlling the amount of radiant heat generated by the heater elements will, in theory, be an indication of the plastic material temperatures and, as a result, the theoretical "blow-up" or increase in thickness of the material, in actuality considerable deviations have been encountered in the thickness of the foamed material after heating in comparison with the presumed final ideal thickness of the material. These differences between the actual blow-up thickness and the intended or contemplated thickness of the foam plastic material may be occasioned, among other factors, by the cycling on and off of the heaters during normal operation, low or high spot temperatures at various locations within the oven, or varying conditions within the oven, all of which tend to adversely affect the uniformity or extent of heating of the plastic material and, as a result, the extent of blow-up and consistency of any thermoformed articles produced from the non-uniformly heated material, possibly resulting in voids, uneven articles and poor molded definition of the product.

While the actual thickness of the expanded foam material is of particular importance relative to the quality and shape of the resultant thermoformed article, heretofore, no means has been available to routinely monitor this process factor prior to the molding cycle. Rather, it has been the practice of the equipment operator to occasionally observe formed product exiting from the production mold either visually or by gauge measurement, and react to heat related product deficiencies via manual adjustments to one or more of the various oven heat zones, without knowing the actual sheet thickness as the sheet enters the forming mold.

SUMMARY OF THE INVENTION

The invention according relates to the provision of an apparatus of either a contact or non-contact nature which will measure and display the thickness of the foam material just prior to entry into the product molding section of the thermoforming installation. Additional thickness sensing devices in the sheet heating environment can also be incorporated to monitor the change in thickness of the thermoplastic foam material as it moves along the length of the oven and the heat is absorbed and/or the use of the measured thickness as a control element for the operation of the thermoformer oven.

The invention specifically provides for sensors within the thermoformer oven which measure the "blow-up" or thickness of the heat expanded foam material at one or more locations within the oven. The sensors are connected to oven controllers which afford visual readouts of the measured thickness to an operator. The oven controllers are in turn, connected to the heater elements of the oven so that, when the thickness or "blow-up" which have been sensed deviate from a desired thickness for the foam plastic material which is being heated during its passage through the thermoformer oven, the operator may vary the energy or power input to the heater elements in that zone or zones of the oven so as to either increase or decrease the heat radiating against the sheet of plastic material. This will, in a simple and advantageous manner, permit control over the oven operation so as to achieve a more precise and uniformly distributed heating and heat expansion or blow-up of the plastic material prior to the discharge thereof to the thermoforming press.

Pursuant to one aspect of the invention, the foam material thickness sensor may include structure adapted to be contacted by the surface of the plastic material, such as a lightweight skid or slider element which is covered with a low-friction material, and which is connected to an oven element temperature controller.

In another aspect of the invention, the thickness sensor does not contact the surface of the sheet of plastic material but only extend into proximity therewith. Non-contacting sensors of that type may be infrared detectors which measure the heat emitted by the plastic material in order to determine the actual proximity of the material and resultingly, the expansion thereof.

Accordingly, it is a primary object of the present invention to provide a method for the measurement of the actual thickness of sheets of a thermoformable foam plastic material which is being heated while transported through a thermoformer oven.

Another object of the invention resides in the provision of a method for measuring the actual sheet thickness at a plurality of locations within the thermoformer oven.

A further object of the invention provides a method of varying the energy supply to the heater elements of the thermoformer oven in response to the actual thickness or blow-up measured on the sheet so as to enable controlling operation of the oven to produce the desired blow-up thickness for the sheet.

In summation, the primary benefit of the novel foam material blow-up measuring method and thickness measuring devices pursuant to the invention, and for regulating the temperatures within the thermoformer oven, resides in the provision of a more consistently and uniformly heated thermoformable foam material resulting in an improved thermoformed product consistency. The concept of the invention in obtaining accurate control over the operation of the thermoformer oven is based upon:

(1) Utilization of foam material thickness sensing devices for reading of the actual sheet thickness at one or more locations within the oven;

(2) Varying the energy supply or power inputs to respective of the heater elements based on the information obtained to provide and maintain the sheet temperatures at desired levels and obtaining optimum foam material blow-up prior to the thermoforming operation.

BRIEF DESCRIPTION OF THE DRAWINGS

Reference may now be had to the following detailed description of exemplary embodiments of an apparatus for controlling thermoformer oven operation in response to actual foam material blow-up which is sensed in a sheet of thermoformable plastic film being transported through the thermoformer oven, taken in conjunction with the accompanying drawings; in which.

DETAILED DESCRIPTION

Figure 1:
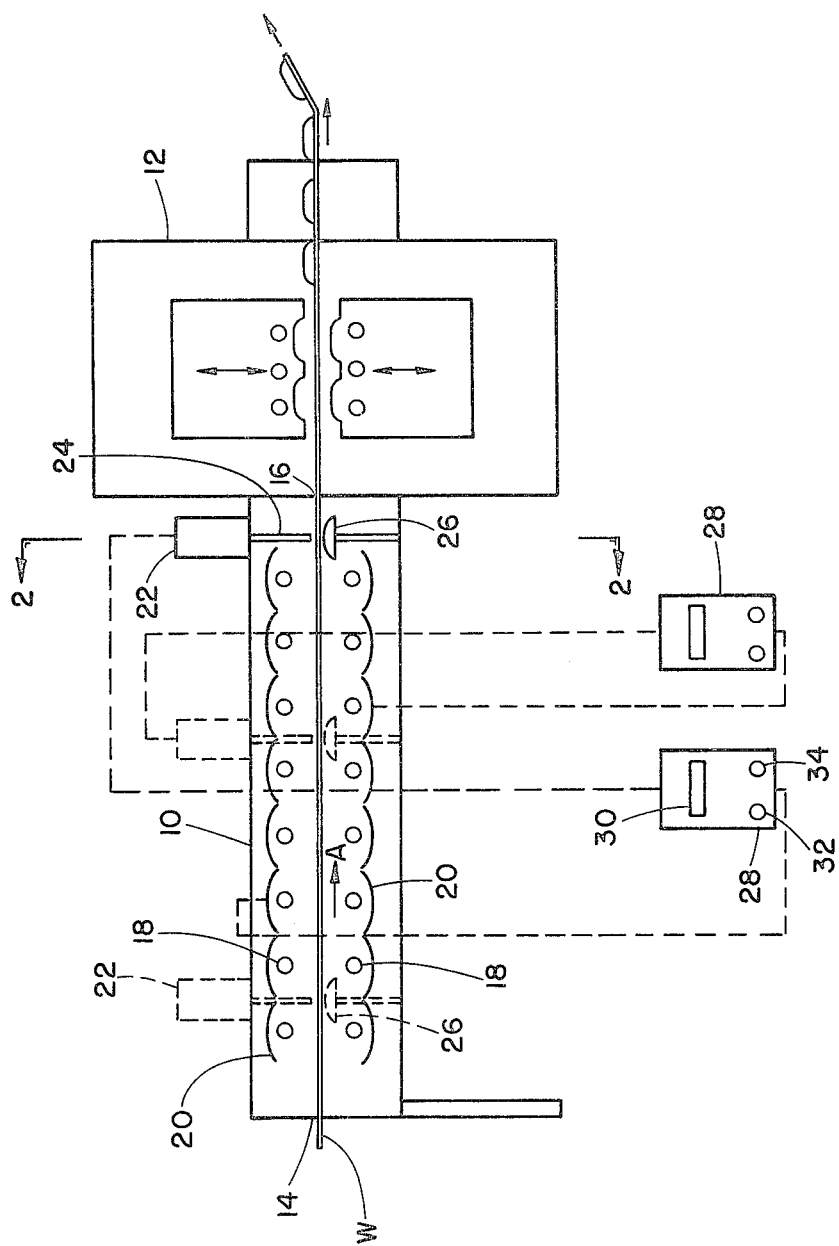
FIG. 1 illustrates a schematic representation of a thermoforming installation incorporating the thermoformer oven controlling apparatus pursuant to the invention.
Figure 2:
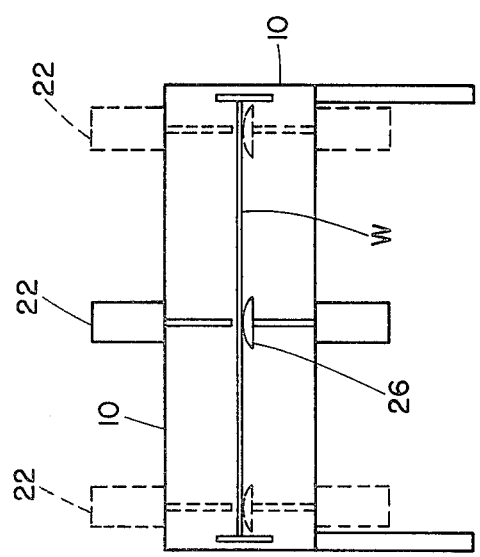
FIG. 2 is a sectional view through the installation taken along line 2—2 in FIG. 1.

Referring now in detail to FIGS. 1 and 2 of the drawings, schematically illustrating a thermoforming installation pursuant to the invention, in which the installation includes a thermoformer oven 10 which communicates at its outlet or discharge end with a forming station 12 comprising a mold or thermoforming press. In the illustrated embodiment, a sheet W of a thermoformable foam plastic material is supplied from a supply roll (not shown) or other suitable supply source into the infeed end 14 of the thermoformer oven 10. Within the thermoformer oven 10 the sheet of plastic material W is transported by means of suitable edge gripping devices (not shown) in the direction of arrow A towards the discharge end 16 of the oven which, in general, is contiguous to or closely adjoins the inlet end of the forming station 12.

The interior of the thermoformer oven 10 is typically radiantly heated through a series of heater elements 18 normally extending transverse to the direction of travel of the plastic material sheet W both above and below the plane of travel of the web. As illustrated, in this instance the heater element may consist of a plurality of heating rods 18 extending from side to side of the thermoformer oven and having an arcuate reflector 20 positioned behind each of the heater elements in order to radiate the generated heat towards the surfaces of the plastic material sheet W so as to heat the latter. Additional heater rods or elements may be provided along the side edges of the oven along the direction of the travel of the sheet W therethrough in order to compensate for heating losses caused by the edge gripping devices. The utilization of the illustrated heater rod elements is exemplary, other suitable heating devices, such as heater plates, infrared heating devices, ceramic plates with inserted heating coils and the like also being applicable to provide the necessary heating of the sheet.

The temperature of the heater elements within the thermoformer oven 10 is maintained at a predetermined level through suitable control over the energy supply to the heater elements so as to heat the plastic material sheet W to a predetermined consistent temperature level at the discharge end 16 prior to the discharge or conveyance of the sheet from the thermoformer oven into the forming station 12.

Positioned at various predetermined locations within the thermoformer oven 10 are material thickness sensing devices 22, as described hereinbelow, which are adapted to measure the actual sheet thickness or blow-up while the sheet is conveyed therepast through the thermoformer oven 10.

Figure 3:
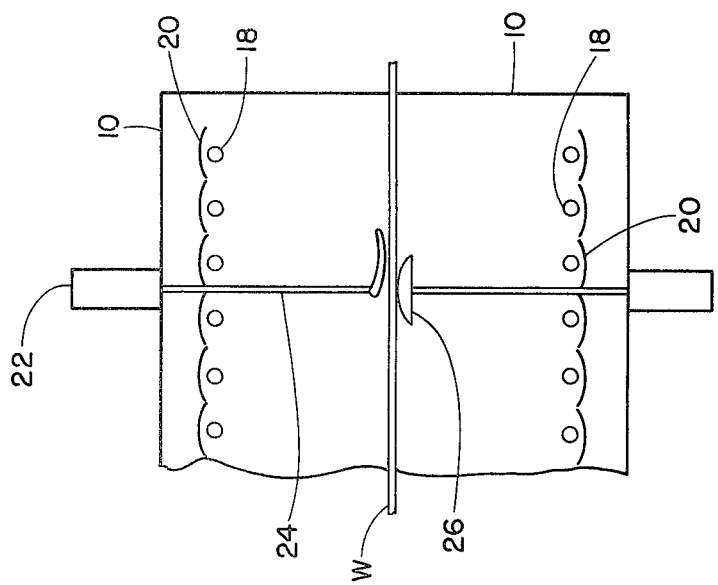
FIG. 3 is a fragmentary sectional view on an enlarged scale of a material thickness sensing device of the material contacting type.

Each of these thickness sensing devices 22 may include an insulated tube-like element 24 extending vertically into the thermoformer oven into close proximity with the surface of the web W. A thickness sensing device may extend through the length of the element 24 to the top of the oven and be conducted outwardly to an indicator and/or recorder. In the case of a contacting thickness sensor being employed, as illustrated in FIG. 3 of the drawings, the end of the element 24 proximate the sheet W includes a small elongate skid formed of low-friction material, such as thin Teflon (Reg. TM) which is adapted to be contacted by the surface of the web W, with a thickness sensing device attached to the wires being adhered thereto. The skid is formed of Teflon and is of a light weight in order to maintain any frictional heat generated by the contact with the plastic sheet at a minimum, since such frictional heat may adversely affect the accuracy of any reading by the thickness sensing device 22.

The sheet W is supported on an inverted cup-like member 26 which will maintain the sheet in a precise plane during its conveyance through the thermoformer oven.

Each of the thickness sensing devices 22 is connected with a suitable oven controller 28 which provides for a visual display or readout 30 indicative of the thickness or blow-up of the sheet W at the associated sensed location within the thermoforming oven 10. Each of the controllers 28 is connected to, respectively, one or more of the heater elements 18 within a predetermined zone in the thermoformer oven 10 and incorporates suitable control knobs 32 and 34 for increasing or decreasing the power of energy supply to the heater elements 18, depending upon an upward or downward deviation from a desired thickness of the sheet W at that particular location within the thermoformer oven 10.

Thus, positioning thickness sensing devices 22 at various critical locaions in the thermoformer oven 10, and being able to monitor the actual sheet blow-up at various locations on the surface of sheet W will enable an operator to adjust and thereby control the temperature of the oven 10 by varying the energy supplied by the heating elements 18, so as to adjust and maintain the temperature of web W at predetermined desired temperature levels, and thereby control the extent of material blow-up to a required sheet thickness.

Figure 4:
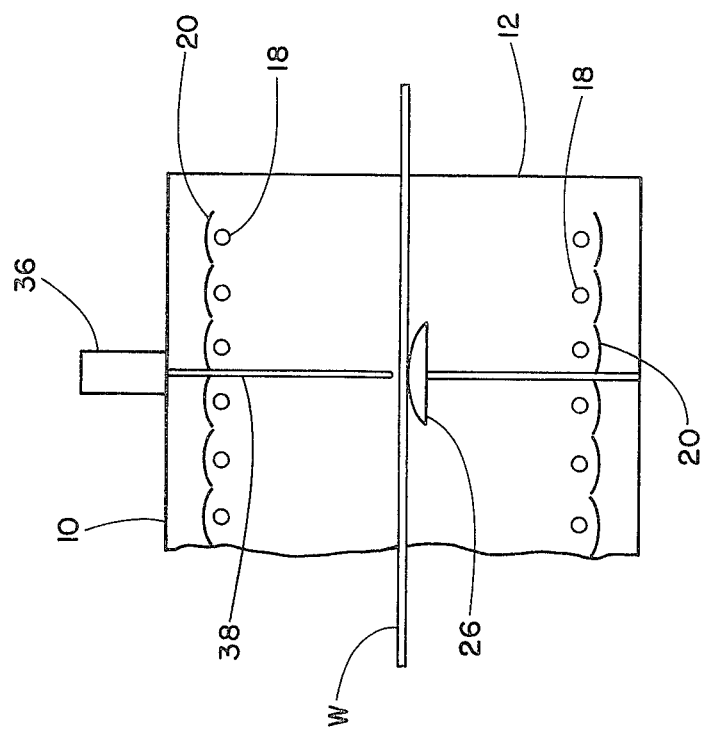
FIG. 4 is a fragmentary sectional view on an enlarged scale similar to that of FIG. 3 illustrating a non-contacting material thickness sensing device.

In an alternate, preferred embodiment of the invention, as illustrated in FIG. 4 of drawings, each foam material thickness sensing device 36, which may be arranged at locations in the thermoformer oven analogous to those contemplated for the sensing devices 22 in the embodiment of FIG. 3, senses the actual blow-up of the sheet W by means of a heat sensor which extends into close proximity with the upper surface of the sheet, and includes a thermocouple-mounting tube element 38 which does not contact the sheet. Such a non-contacting blow-up sensing device may consist of, for example, an infrared heat sensing unit as is known in the art. The utilization of the non-contacting temperature sensors will provide for an enhanced degree of precision in measuring the actual surface thickness or blow-up of the sheet inasmuch as the non-contacting sensors eliminate any possible errors caused by frictional heat which may be generated between the contacting portion 26 of the sensor device 22 in the embodiment of FIG. 3.

Although the oven controllers are described as being manually controlled by an operator, it may be possible to effect automatic control over the thermoformer oven, such as through the use of a microprocessor.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

I claim:

1. A method of measuring and controlling foam plastic sheet blow-up by regulating the operation of a thermoformer oven responsive to measuring of the thickness of a continuous sheet of a thermoformable foam plastic material which is conveyed through said thermoformer oven towards a thermoforming installation; comprising:

(a) sensing the sheet thickness of the thermoformable material at a plurality of locations within said thermoformer oven;

(b) and regulating the temperatures within said thermoformer oven in response to the sensed sheet thickness for maintaining the temperatures of said web of thermoformable material at predetermined temperature levels so as to thereby obtain a requisite blow-up of the material.

2. A method as claimed in claim 1, comprising sensing the sheet thickness by positioning thickness sensors at a plurality of locations within said thermoformer oven, said sensors measuring the extent of blow-up of said web of said material at each said location within said oven.

3. A method as claimed in claim 2, comprising determining the blow-up of said material through contact sensors contacting the surface of said sheet during conveyance of the latter through said oven.

4. A method as claimed in claim 2, comprising determining the blow-up of said material through non-contacting sensors during conveyance of the material through said oven.

5. A method as claimed in claim 4, comprising sensing the blow-up of said material through infrared sensors.

6. A method as claimed in claim 3, wherein said sheet is adapted to be contacted by said contact sensor in said oven, said contact sensor determining the thickness of the contacting sheet.

7. A method as claimed in claim 1, including a plurality of heater elements within said oven defining a plurality of heating zones, comprising varying the power inputs of the heater elements responsive to the sensed blow-up of said foam material to maintain the material temperatures within predetermined temperature ranges within the respective heating zones in said oven.

8. A method as claimed in claim 7, comprising automatically varying the power inputs to said heater elements responsive to the measured blow-up of said material.

9. An apparatus for measuring and controlling foam plastic material blow-up to regulate the operation of a thermoformer oven responsive to measurements of the thickness of a sheet of thermoformable plastic material which is conveyed through said thermoformer oven towards a thermoforming installation; comprising:

(a) thickness sensor means in said thermoformer oven; said sensor means including an element extending towards said sheet and being adapted to measure the blow-up of said sheet;

(b) and means for regulating the temperatures within said thermoformer oven based on the measured sheet blow-up for maintaining the temperature of said sheet at predetermined temperature levels and to control the extent of material blow-up.

10. An apparatus is claimed in claim 9, said sensor means comprising sheet contacting means on said element; and a thickness measuring devices on said sheet contacting means for measuring said sheet thickness.

11. An apparatus as claimed in claim 10, said sheet contacting means comprising a skid of low-friction material contactable by said sheet.

12. An apparatus as claimed in claim 9, including support means for said sheet on which said sheet is transported through said oven, a predetermined gap being defined between said support means and said sensor means for measuring the material thickness.

13. An apparatus as claimed in claim 9, said temperature regulating means comprising an oven controller, said thickness sensing means being connected to said controller to provide visual display of the actual sheet thickness, and said controller including means for regulating the oven temperature to control sheet blow-up.

14. An apparatus as claimed in claim 9, comprising a plurality of heater elements for heating said thermoformer oven, said oven temperature regulating means being adapted to vary the energy supply to said heater elements.

15. An apparatus as claimed in claim 10, said element on said sensor means extending into proximity with said sheet; and means in said element for measuring the blow-up of said sheet.

16. An apparatus as claimed in claim 15, said means in said element comprising an infrared heat-detecting member.

17. An apparatus as claimed in claim 9, comprising a plurality of said thickness sensor means being positioned at various locations in said thermoformer oven for measuring the blow-up over the entire surface of said sheet during conveyance through said oven.

* * * * *